United States Patent [19]
Trubiano

[11] Patent Number: 5,385,357
[45] Date of Patent: Jan. 31, 1995

[54] REAR FOLDING BACKREST FOR SEAT COMPARTMENT OF AN OVER-THE-COUNTER SHOPPING CART

[75] Inventor: Antoine Trubiano, Montreal, Canada

[73] Assignee: Technibilt, Ltd., Newton, N.C.

[21] Appl. No.: 202,278

[22] Filed: Feb. 25, 1994

[51] Int. Cl.⁶ ............................................. B62B 3/00
[52] U.S. Cl. ............................ 280/33.993; 280/33.996
[58] Field of Search ................... 280/33.991, 33.993, 280/33.995, 33.996, 33.997, 33.998

[56] References Cited

U.S. PATENT DOCUMENTS

| | | | |
|---|---|---|---|
| 4,273,346 | 6/1981 | Rehrig | 280/33.996 X |
| 4,423,882 | 10/1984 | Stover et al. | 280/33.993 |
| 4,560,180 | 12/1985 | Ulmer | 280/33.993 |
| 4,875,695 | 10/1989 | Badger et al. | 280/33.993 |
| 5,211,410 | 5/1993 | Trubiano | 280/33.933 |

Primary Examiner—Margaret A. Focarino
Assistant Examiner—Michael Mar
Attorney, Agent, or Firm—Carter & Schnedler

[57] ABSTRACT

An over-the-counter shopping cart having an improved baby seat compartment wherein the backrest of the baby seat is hinged to collapse rearwardly towards the back wall of the cart whenever the main merchandise-carrying basket is hinged upwardly to nest the carts. Accordingly, each time a customer picks up a nested cart, the baby seat compartment is opened with the main merchandise compartment to increase the size of the basket. The backrest of the baby seat compartment is also provided with a protruding extension member along a top edge thereof to maintain the leg holes in the rear wall of the baby seat compartment obstructed so that merchandise placed in the cart does not fall through these leg holes. Because the backrest is not retainingly engaged, when in a position of use, it is usually in a collapsed position when the baby seat compartment is not used, thereby not providing a separating wall in the merchandise compartment so that a cashier may unload the merchandise from the front end of a basket without obstruction or having to release an engaged backrest in the rear part of the cart.

10 Claims, 3 Drawing Sheets

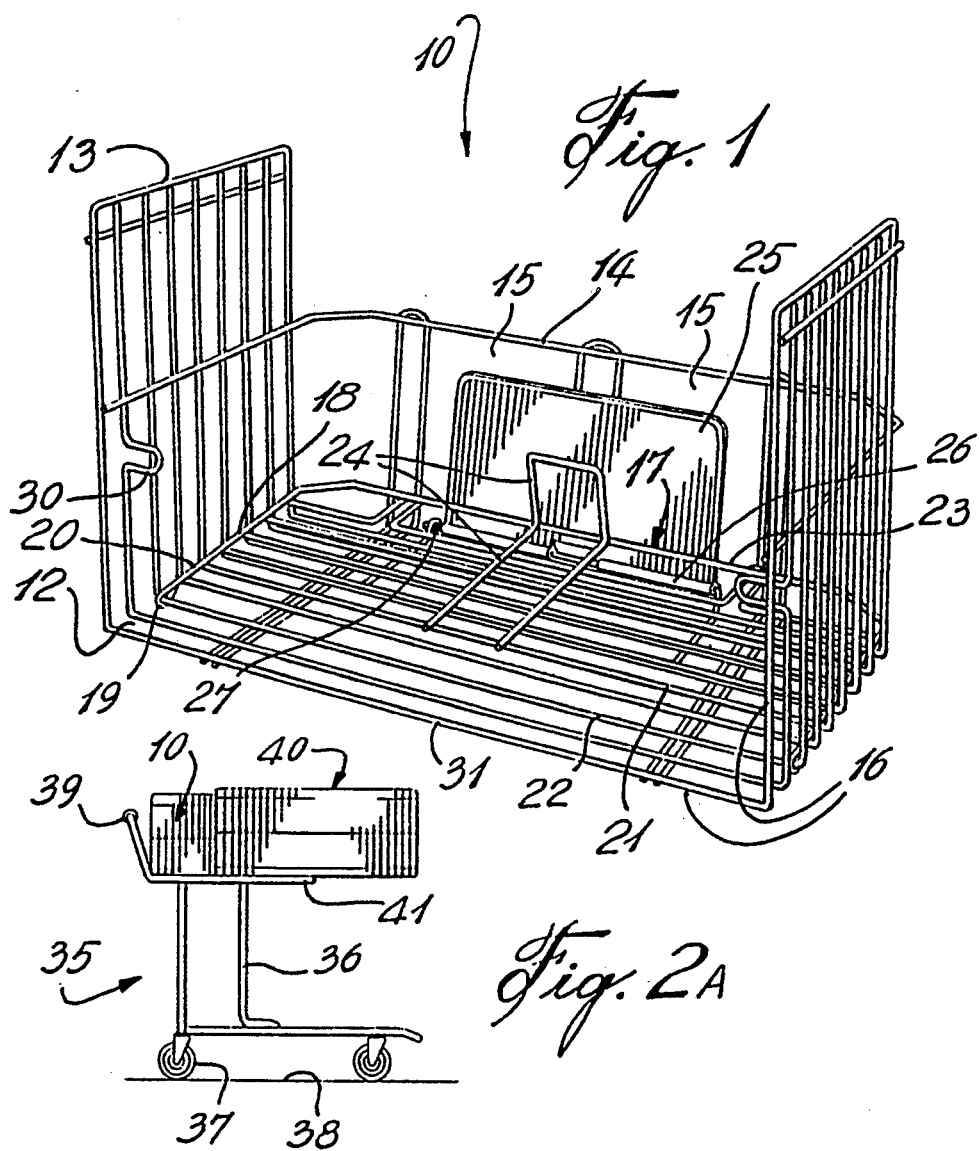
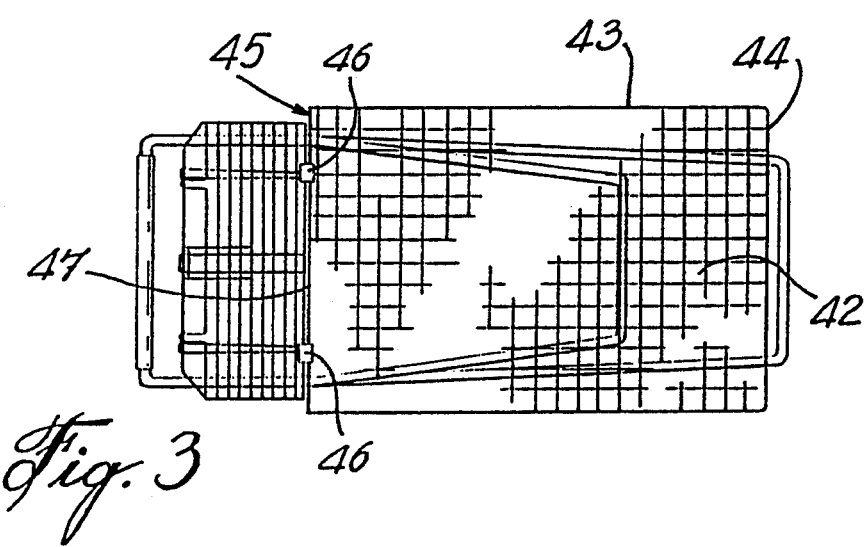

REAR FOLDING BACKREST FOR SEAT COMPARTMENT OF AN OVER-THE-COUNTER SHOPPING CART

TECHNICAL FIELD

The present invention relates to a baby seat compartment for use with an over-the-counter (OTC) shopping cart and wherein the backrest of the compartment is not engaged and hinges rearwardly of the cart to a collapsed position, when not required, or when the main merchandise-carrying basket is raised on its hinge to a vertical nesting position, and further wherein the backrest is provided with protrusion means to maintain the leg holes in the rear wall of the baby seat compartment obstructed when in its collapsed position.

BACKGROUND OF INVENTION

In my earlier U.S. Pat. No. 5,211,410 issued May 18, 1993, I describe the construction of a baby seat compartment for use with an over-the-counter type shopping cart. With this type of baby seat compartment, the backrest is retained captive in a position of use by actuable engageable means provided in the backrest and retained within slots provided in the side walls of the baby seat compartment. U.S. Pat. No. 4,423,882 discloses a similar type baby seat compartment wherein the backrest is retained in engagement when in use. A disadvantage of such baby seat compartments is that these backrests are often in their engaged position and when the user picks up a shopping cart, he will not take the trouble to lower this backrest. The user then places merchandise in both the front basket and the baby seat compartment which also acts as a basket when a child is not seated thereon. The baby seat compartment is located rearwardly of the cart, it is very convenient to the user and small items such as glass jars, are placed in this compartment. Because the rear wall of the baby seat compartment is provided with large openings, constituting leg holes for a child, it often occurs that merchandise will fall through the leg holes and often cause injury to the user or others if the merchandise is breakable. It is also known to provide a seat plate hinged along the lower edge of these leg holes so that when the seat plate is raised, it obstructs these leg holes. My seat plate, as described in an earlier patent, is provided with spring-biasing means which keeps it up against the leg holes, but with many shopping carts, the seat plate is not spring-biased and usually rests horizontally on the bottom wall of the baby seat compartment, in non-obstructing relationship with the leg holes.

With the shopping carts of the type referred to hereinabove, as described in the two patents referred to, the backrest is hinged to collapse forwardly over the bottom wall of the main merchandise-carrying basket. Therefore, when the main basket is lifted to its vertical position for nesting, it must displace the backrest of the baby seat compartment and cause it to automatically move to its disengaged position. If certain ones of the wires are bent in the backrest, it may cause the backrest to jam and prevent the main basket from being tilted to its vertical nesting position. It may also cause the front basket to fall forwardly when placed in its vertical nesting position and cause injury. Furthermore, because the backrests need to be positively engaged, when in use, their construction as well as the construction of the side walls of a baby seat compartment are more complicated in order to provide latching means to engage the backrest.

SUMMARY OF INVENTION

It is a feature of the present invention to provide an improved baby seat compartment for an over-the-counter shopping cart and which substantially overcomes the above-mentioned disadvantages of the prior art.

Another feature of the present invention is to provide a baby seat compartment for an over-the-counter shopping cart and wherein the backrest is constructed without latching means and hinged to collapse rearwardly within the baby seat compartment.

Another feature of the present invention is to provide a baby seat compartment for an over-the-counter shopping cart and wherein the backrest is provided with a protrusion means, in the form of a handle, and which maintains the leg holes in the rear wall of the baby seat compartment obstructed.

Another feature of the present invention is to provide a baby seat compartment for an over-the-counter shopping cart and wherein the protrusion means formed in the top edge of the backrest prevents a seat plate, which is biased against the leg holes, from being hinged out of its obstructing position when the backrest is in its collapsed position.

Another feature of the present invention is to provide a baby seat compartment for an over-the-counter shopping cart and wherein protrusion means are formed in the top edge of the backrest for obstructing the leg holes formed in the back wall of a baby seat compartment when the backrest is in its collapsed position.

Another feature of the present invention is to provide a baby seat compartment for an over-the-counter shopping cart and wherein the backrest thereof is automatically displaced from a position of use to a storage position, without the need to unlatch same, when the main merchandise-carrying basket is tilted vertically to its nesting position.

Another feature of the present invention is to provide a baby seat compartment for an over-the-counter shopping cart and wherein the backrest is usually in its collapsed position, thereby increasing the capacity of the shopping cart main merchandise carrying basket and is provided with protrusion means to prevent the use of the baby seat compartment when not necessary to seat a child therein, by causing obstruction to the leg holes in the rear wall of the baby seat compartment, making the over-the-counter shopping cart much safer to use.

According to the above features, from a broad aspect, the present invention provides an over-the-counter shopping cart comprising a frame supported on wheels. The frame has an elevated basket support section. A main merchandise-carrying basket is secured forwardly over the support section. A baby seat compartment is secured to a rear portion of the support section. Handle means is provided to displace the shopping cart. The main merchandise-carrying basket has a bottom wall, side walls, a front wall and an open rear end. The baby seat compartment also has a bottom wall, side walls, a rear wall with leg holes therein, an open front end, and a hinged backrest. The hinged backrest is hinged at a lower edge a predetermined distance from the open front end, whereby the backrest can be swung down over the bottom wall towards the rear wall to a storage position. Arresting means is provided to prevent the hinged backrest from hinging forwardly through the open front end and for maintaining the backrest at an elevated position of use. Protrusion means is secured to the backrest and extends out of the open front end when the backrest is at its position of use. The main merchandise-carrying basket bottom wall has a hinge connection at the open rear end adjacent the open front end of the baby seat compartment. The merchandise-carrying basket is wider than the baby seat compartment. The merchandise-carrying basket, when displaced to a substantially vertical storage position on its hinge connection, its bottom wall lies against the substantially vertical plane of the open front end of the baby seat compartment and pushes against the protrusion means of the backrest when in its position of use, to cause the backrest to collapse on its hinge to its storage position.

BRIEF DESCRIPTION OF DRAWINGS

A preferred embodiment of the present invention will now be described with reference to the accompanying drawings in which:

FIG. 1 is a perspective view illustrating the construction of the baby seat compartment of the present invention for use with over-the-counter (OTC) shopping carts;

FIG. 2A is a simplified side view of an over-the-counter shopping cart equipped with the baby seat compartment of the present invention;

FIG. 3 is a top view of FIG. 2A;

DESCRIPTION OF PREFERRED EMBODIMENTS

Figure 7:
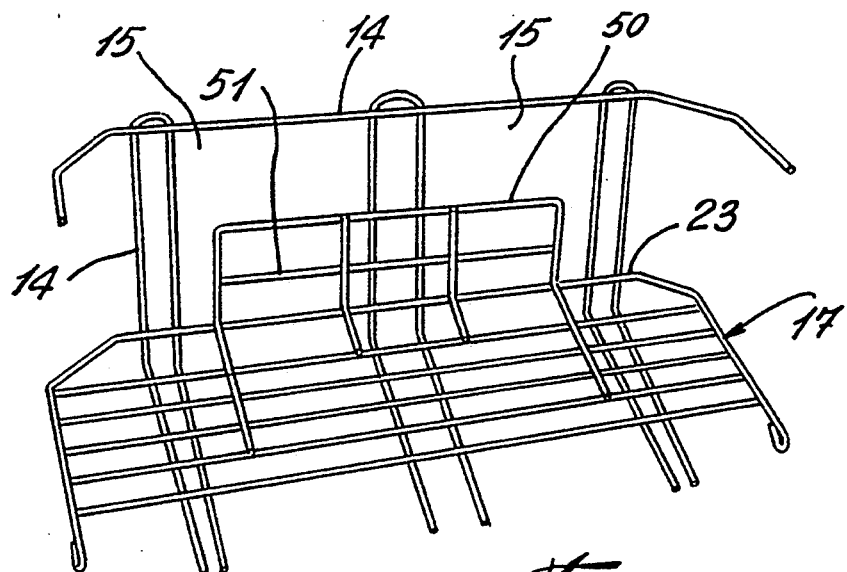
FIG. 7 is perspective view similar to FIGS. 4 and 5 but illustrating a modification of the protrusion means formed in the top edge of the backrest whereby to substantially obstruct the leg holes of the rear wall of the baby seat compartment.

Referring to the drawings and more particularly to FIGS. 1 and 4 to 6, there is shown generally at 10, the construction of the baby seat compartment of the present invention. It is constructed of wire rods 11, as is well known in the art, and defines a bottom wall 12, opposed side walls 13, a rear wall 14 having leg holes 15 therein, and an open front end 16. A backrest panel 17 is formed of welded wire rods and has two opposed side wire rods 18 each having a loop end 19, in extensions 20 thereof, projecting beyond a lower edge rod 21 of the backrest 17. The loop ends 19 are connected to a wire rod 22 of the bottom wall 12 and disposed inwardly spaced, a predetermined distance, from the open front end 16.

Figure 4:
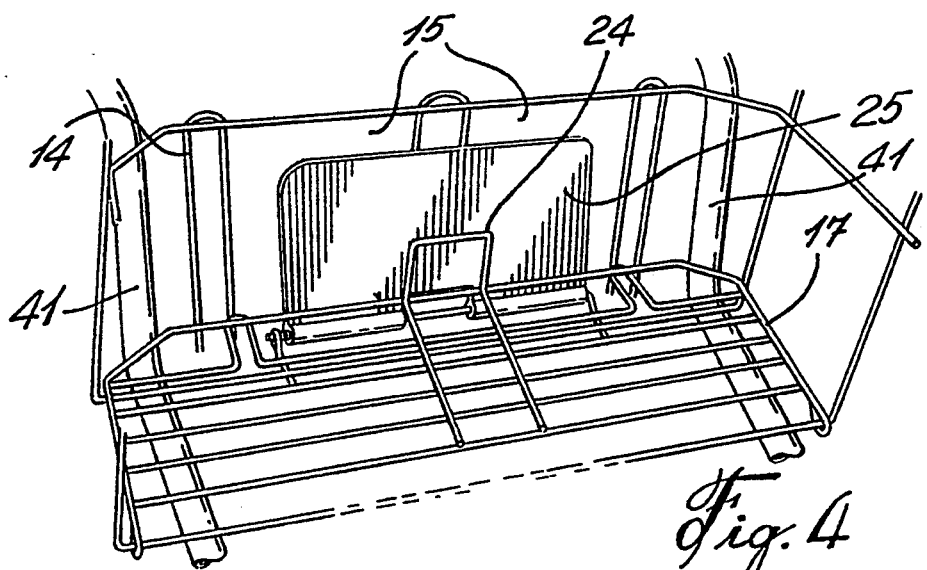
FIG. 4 is a fragmented perspective view showing the construction of the backrest of the baby seat compartment in its collapsed position and maintaining the seat plate against the leg holes of the rear wall to obstruct the leg holes.
Figure 5:
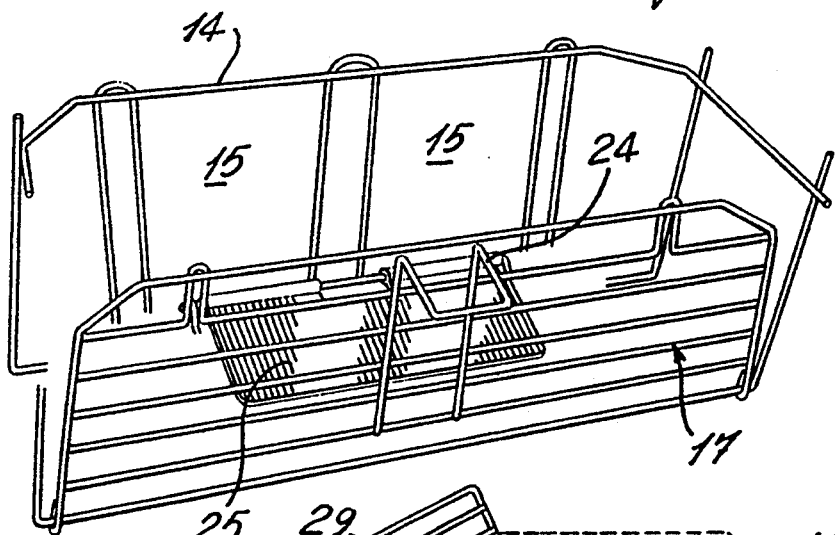
FIG. 5 is a fragmented perspective view similar to FIG. 4 but showing the backrest in its position of use and the seat plate displaced against the bottom wall of the baby seat compartment.

As herein shown, the backrest is constructed whereby when in its collapsed position, as shown in FIG. 1, the top edge rod 23 is disposed in close proximity adjacent the rear wall 14. Protrusion means, herein shown as a U-shaped wire rod member 24, extends from the top edge rod 23 substantially transversely thereof, and facing upwardly within the baby seat compartment, when the backrest is in its collapsed position. The U-shaped rod member 24 constitutes a handle to raise the backrest to its position of use, as shown in FIG. 4. This U-shaped rod member 24 also extends in close proximity to a seat plate 25 which is hinged at its lower edge 26 and spring-biased by a helical spring 27 to its obstructing position against the leg holes 15. The U-shaped rod member 24 extends in front of the seat plate and prevents the seat plate 25 from being displaced on its hinge, inwardly within the baby seat compartment when the backrest is collapsed. Accordingly, this member 24 provides added security in maintaining the leg holes obstructed by the seat plate.

Figure 6:
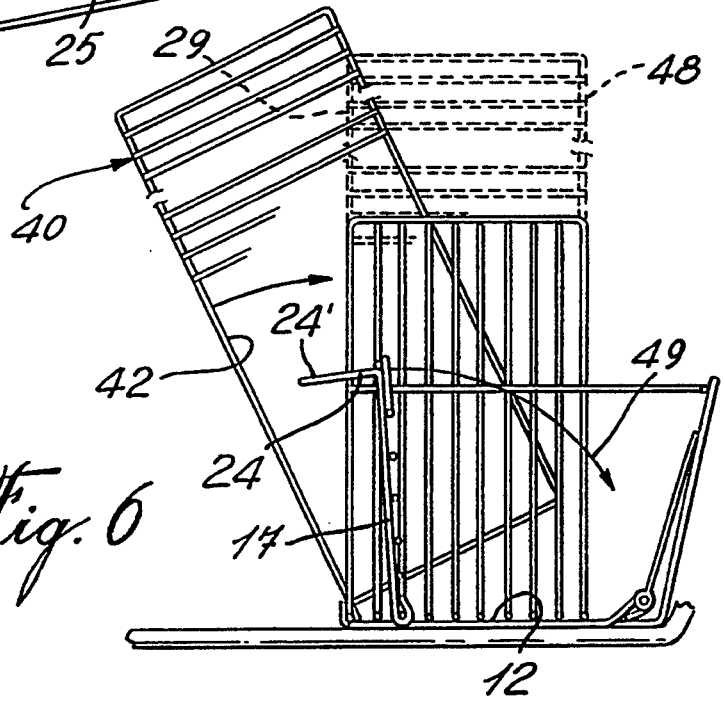
FIG. 6 is a simplified fragmented side view showing the manner in which the backrest is automatically displaced to its storage position when the main merchandise-carrying basket is tilted to a vertical nesting position.

The protrusion means, herein the transverse U-shaped rod member 24, extends beyond the top edge rod 23 a predetermined distance whereby when the backrest is in its position of use, as shown in FIG. 6, a portion, herein portion 24', of the transverse U-shaped member 24, extends beyond the open front end or the vertical plane 29 thereof and is arrested to this position by arresting means in the form of inwardly bent wire sections constituting arresting shoulders 30 formed in the side walls 13. These arresting shoulders 30 are disposed a predetermined distance above the bottom wall 12 of the baby seat compartment and are disposed in a plane spaced between the wire rod 22, on which the loop ends 19 of the backrest 17 are connected, and the outer rod 31 of the bottom wall 12, whereby, as shown in FIG. 6, when the backrest 17 is in its position of use, the backrest is slightly angled forwardly in the direction of the open front end 16.

Figure 2B:
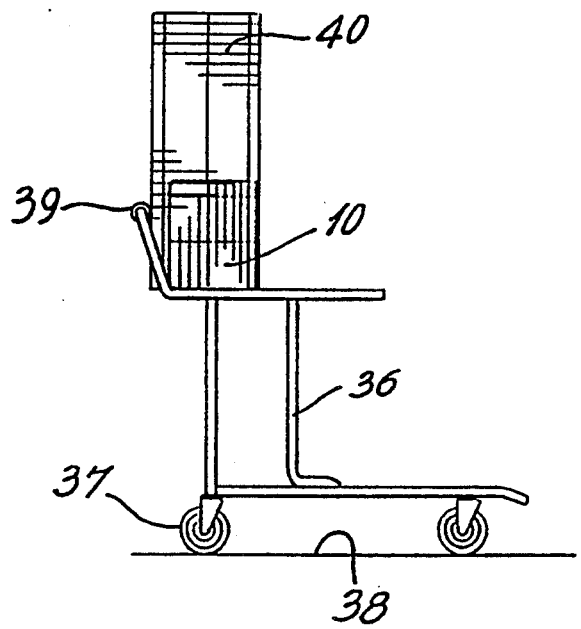
FIG. 2B is a view similar to FIG. 2A showing the cart in its storage condition for nesting.

Referring now additionally to FIGS. 2A, 2B and 3, there is shown generally at 35 in FIG. 2A, an over-the-counter shopping cart utilizing the baby seat compartment 10 of the present invention. As herein shown, the over-the-counter shopping cart 35 is comprised essentially of a frame 36 which is supported on wheels 37 and the shopping cart is displaced on a floor surface 38 by a person (not shown) pushing the cart by means of the handle 39. A main merchandise-carrying basket 40 is secured forwardly over a substantially horizontal support section 41 of the frame 36 and rests thereon. The main merchandise-carrying basket has a bottom wall 42, side walls 43, a front wall 44, which may be hinged, and an open rear end 45. The main basket bottom wall 42 is provided with hinge connections 46 secured to its end rod 47 at its open rear end 45 which are connected to the horizontal support frame 41 whereby the front basket or main merchandise-carrying basket 40 can be lifted towards a vertical storage position, as illustrated by phantom lines 48 in FIG. 6 and shown in FIG. 2A. As shown in FIG. 6, when the backrest 17 is in its position of use, and the main merchandise-carrying basket 40 is hinged upwardly, the bottom wall of the main basket 40 will push against the protruding end section 24' of the U-shaped member 24, causing the rear gate to move rearwardly in the direction of arrow 49 to collapse on the bottom wall 12 of the baby seat compartment. Accordingly, when the over-the-counter shopping cart is nested, the backrest is in its storage position. Therefore, the next person to use the shopping cart will be presented with the full capacity of the shopping basket, and namely, the main merchandise-carrying basket and the baby seat compartment, unobstructed by the backrest 17, and with the seat plate 25 engaged securely in obstructing relationship with the leg holes 15 to provide a large compartment which can securely retain merchandise.

Referring now to FIG. 7, there is shown a further modification of the protrusion means 24. As herein shown, this protrusion means is herein shown as a wire framed panel 50 which extends substantially transversely from the top edge 23 of the backrest 17 and projects forwardly towards the main merchandise-carrying basket when the backrest is in its position of use. The wire framed panel 50 consists of transversely interconnected rods 51 and is of sufficient size to obstruct a major portion of the leg holes 15 formed in the rear wall 14 of the baby seat compartment. Accordingly, if the baby seat compartment is not provided with a seat plate 25 which is spring-biased against the leg holes, this panel 50 will always ensure that the leg holes 15 are obstructed.

It is within the ambit of the present invention to cover any obvious modifications of a preferred embodiment described herein, provided such modifications fall within the scope of the appended claims.

I claim:

1. An over-the-counter shopping cart comprising a frame supported on wheels, said frame having an elevated basket support section, a main merchandise-carrying basket secured forwardly over said support section, a baby seat compartment secured to a rear portion of said support section, and handle means to displace said shopping cart; said main merchandise-carrying basket having a bottom wall, side walls, a front wall, and an open rear end; said baby seat compartment having a bottom wall, side walls, a rear wall with leg holes therein, an open front end, and a hinged backrest; said hinged backrest being hinged at a lower edge a predetermined distance from said open front end whereby said backrest can be swung down over said bottom wall of said baby seat compartment towards said rear wall to a storage position, arresting means to prevent said hinged backrest from hinging forwardly through said open front end and for maintaining said backrest at an elevated position of use, protrusion means secured to said backrest and extending forwardly through said open front end into said main basket when said backrest is at said position of use, said main merchandise-carrying basket bottom wall having a hinge connection at said open rear end adjacent said open front end of said baby seat compartment; said merchandise-carrying basket being wider than said baby seat compartment, and said merchandise-carrying basket, when displaced to a substantially vertical storage position on said hinge connection with its bottom wall lying against a substantially vertical plane of said open front end of said baby seat compartment, being engageable with said protrusion means to push against said protrusion means of said backrest, when in said position of use, to move said backrest to said storage position.

2. A shopping cart as claimed in claim 1 wherein said protrusion means also constitutes handle means to lift said backrest from said storage position to said position of use.

3. A shopping cart as claimed in claim 1 wherein said protrusion means constitutes an obstruction means to obstruct said leg holes when said backrest is at said storage position.

4. A shopping cart as claimed in claims 1 and 2 wherein there is further provided a seat plate hinged substantially in the plane of said baby seat compartment bottom wall below said leg holes of said rear wall so as to obstruct said leg holes when hinged against said rear wall, said protrusion means maintaining said seat plate in said position of obstruction of said leg holes when said backrest is at said storage position.

5. A shopping cart as claimed in claim 4 wherein said seat plate is a spring-biased seat plate which is urged by spring means against said rear wall to obstruct said leg holes.

6. A shopping cart as claimed in claim 1 wherein said arresting means are wire rod projections formed integrally with said side walls of said baby seat compartment and extending inwardly thereof, said projections being disposed between said lower edge of said backrest and said open front end whereby said backrest is arrested forwardly inclined when in said position of use.

7. A shopping cart as claimed in claim 1 wherein said backrest is formed of welded wire rods, there being two side wire rods each having a loop end in extensions thereof projecting beyond a lower edge rod of said backrest, said loop ends being connected about a wire rod of said baby seat compartment bottom wall and spaced inwardly from said open front end.

8. A shopping cart as claimed in claim 2 wherein said handle means is formed by a U-shaped wire rod secured to said backrest, said U-shaped wire rod extending at substantially right angles to said backrest and projecting forwardly towards said main merchandise-carrying basket when said backrest is at said position of use.

9. A shopping cart as claimed in claim 3 wherein said protrusion means is a wire framed panel section extending substantially transversely from a top edge of said backrest and projecting forwardly towards said main merchandise-carrying basket when said backrest is at said position of use.

10. A shopping cart as claimed in claim 1 wherein said lower edge of said hinged backrest is hinged to said bottom wall of said baby seat compartment, said hinge connection of said main merchandise-carrying basket being secured to said support section of said frame.

* * * * *